Fig. 1.

Inventors:
William N. Gittings,
Harold T. Seeley,
by Charles E. Tullar
Their Attorney.

Patented June 2, 1931

1,808,543

UNITED STATES PATENT OFFICE

WILLIAM N. GITTINGS, OF UPPER DARBY, AND HAROLD T. SEELEY, OF YEADON, PENNSYLVANIA, ASSIGNORS TO GENERAL ELECTRIC COMPANY, A CORPORATION OF NEW YORK

AUTOMATIC SWITCHING SYSTEM

Application filed March 6, 1930. Serial No. 433,836.

Our invention relates to automatic switching systems and particularly to automatic switching systems for controlling the sequential operation of a plurality of devices. Our invention is of particular utility in multiple unit automatic stations in which the number of units in service is automatically controlled in response to the amount of load being supplied by the station and one object of our invention is to provide an improved arrangement for automatically effecting the connection and disconnection of the units of a multiple unit station.

Another object of our invention is to provide an arrangement which, in case a predetermined abnormal condition occurs renders all of the units temporarily inoperative, and effects when the predetermined condition is restored to normal, the immediate restarting of those units, which were in operation at the time the abnormal condition occurred. In this manner, service is quickly restored to normal as it is not necessary to wait for the various timing devices, usually associated with the master starting elements, to function to effect the sequential starting of the units in the normal manner.

Another object of our invention is to provide an improved arrangement for immediately starting the next idle operative unit in a predetermined sequence when the output of a unit in service exceeds a predetermined value.

Our invention will be better understood from the following description when taken in connection with the accompanying drawings and its scope will be pointed out in the appended claims.

The accompanying two sheets of drawings, when joined together, diagrammatically show one embodiment of our invention in connection with a portion of an automatic control equipment for three rotary transformers. It is to be understood, however, that our invention is not limited to any particular number of units in a multiple unit station nor to the particular type of unit as it is applicable to multiple unit control equipments for all types of transforming, generating, or rectifying devices.

Figure 1:
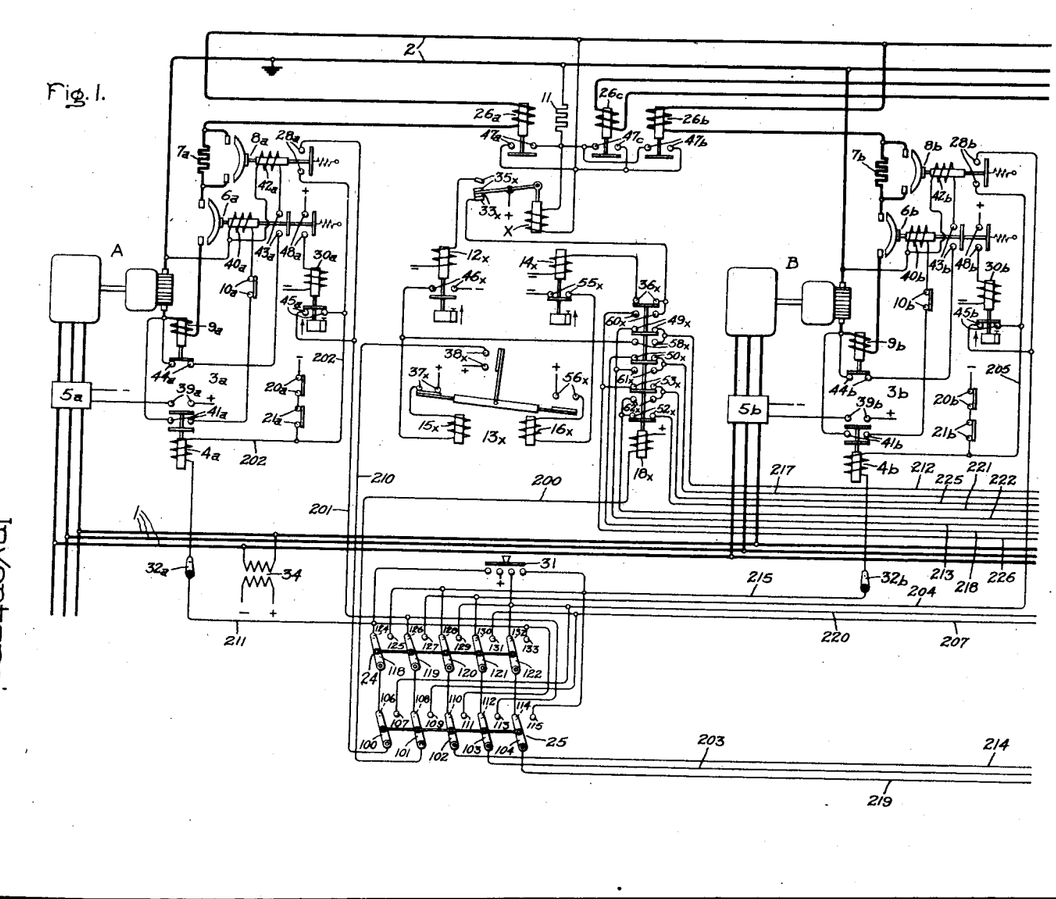
Figure 2:
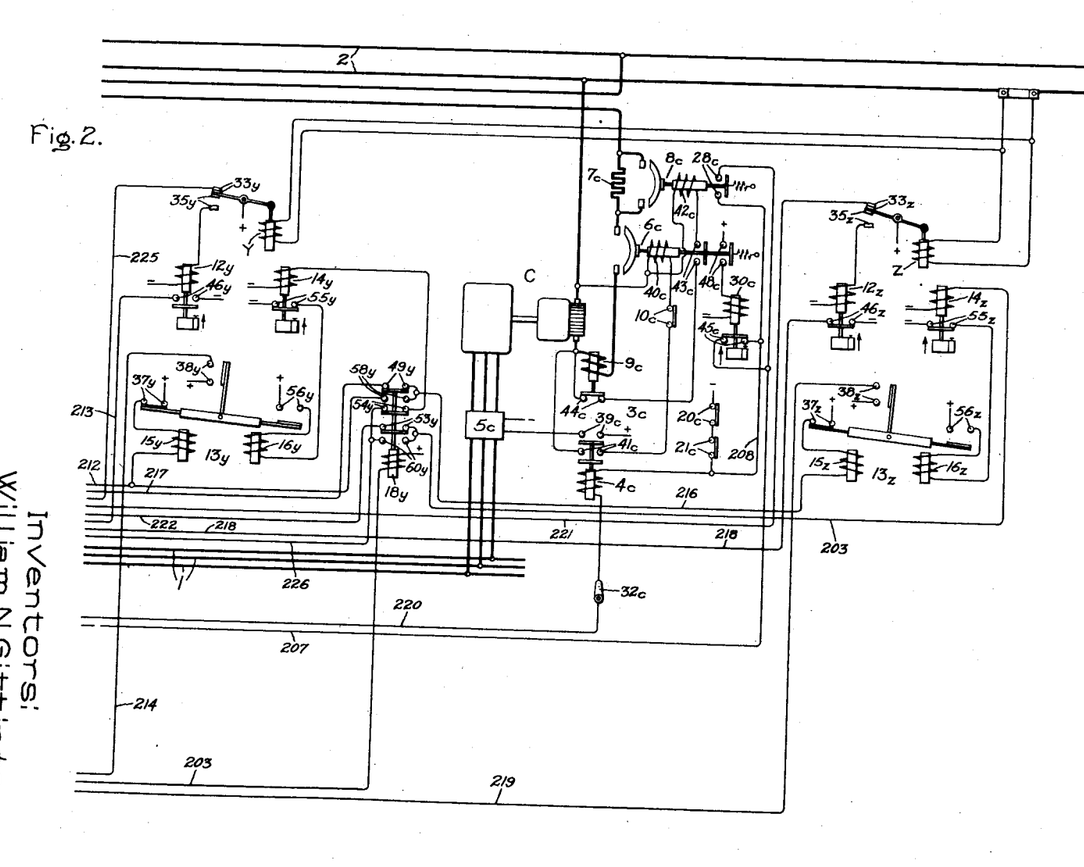

Referring to the Figs. 1 and 2, which constitute the two sheets of drawings, A, B and C respectively represent the units of a three unit rotary transformer substation for transferring power from an alternating current supply circuit 1 to a direct current load circuit 2. Each unit has associated therewith suitable automatic switching means for starting it and for connecting it to the load circuit 2 when the unit is in an operative condition to supply current thereto. Examples of such automatic switching means are well known in the art and since most of the details thereof are immaterial so far as our invention is concerned, we have shown only such portions of the automatic switching means as are necessary for a clear understanding of the present invention. This has been done to simplify the drawings. Also in order to make the drawings and specification easier to follow, corresponding devices associated with each unit are designated by the same number with an attached letter corresponding to the unit with which it is associated. Therefore $3a$, $3b$, and $3c$, represent the automatic switching means associated respectively with units A, B and C.

The automatic switching means $3a$ includes a master relay $4a$ which when energized effects the operation of suitable switching means $5a$ (not shown in detail) whereby the connection of the unit A to the supply circuit 1 and the excitation of the unit are automatically controlled in any suitable manner, to effect the starting of the unit and the proper polarity and magnitude of the direct current voltage thereof during the starting operation.

The automatic switching means $3b$ and $3c$ also include respectively similar master relays $4b$ and $4c$ for controlling similar suitable switching means $5b$ and $5c$.

Examples of suitable means for accomplishing the results accomplished by the switching means $5a$, $5b$ and $5c$ are old and well known in the art, and since they, per se, form no part of our present invention, we deem it unneccessary to complicate the drawings by showing these means in detail.

The automatic switching means 3a also includes a circuit breaker 6a which when closed connects a suitable current limiting device, such as a resistor 7a, in series between the unit A and the load circuit 2, and a circuit breaker 8a which is arranged to short circuit the resistor 7a when the current through the resistor 7a, as indicated by a current responsive relay 9a is below a predetermined value.

The automatic switching means 3b and 3c also include, respectively, similar circuit breakers 6b and 6c, resistors 7b and 7c, circuit breakers 8b and 8c and current relays 9b and 9c. The circuit breakers 6a, 6b and 6c also are controlled by other suitable automatic means whereby they cannot be closed automatically until the respective units have reached the proper condition to be connected to the load circuit 2. Examples of such automatic means are well known in the art. In order to indicate such means for preventing the premature closing of the circuit breakers 6a, 6b and 6c, contacts 10a, 10b and 10c are shown respectively in the closing circuits of the circuit breakers.

Each master relay controls its respective automatic switching means so that when the relay is energized, the associated automatic switching means places the associated unit in service if it is in an operative condition and so that when the relay is deenergized the associated switching means effects the shutting down of the associated unit.

In order to control the sequential operation of the units, a plurality of master control elements X, Y and Z are provided, which are arranged to be operated sequentially. As shown in the drawings, the master control element X is a voltage relay which is connected in series with a suitable resistor 11 across the load circuit 2 and the master control elements Y and Z are current relays which are responsive to the total current output of all of the units in service. The element Y is set to operate in response to a lower value of current than the element Z. It is evident, however, that master control elements X, Y and Z may be any other suitable control devices, either automatically or manually controlled, examples of which are well known in the art. The master element X controls the operation of the leading unit in the station, the master element Y controls the operation of the second unit and the master element Z controls the operation of the third unit.

Each master control element controls suitable timing means which, in turn, controls the operation of a master control relay which controls the energization and deenergization of the master relay associated with the unit to be controlled by the respective master control element. The master control element X is arranged to effect the energization of a time relay 12x when the voltage of the circuit 2 is below a predetermined value, which when energized for a predetermined length of time effects the operation of a master control relay 13x to effect the energization of the master relay of the unit associated therewith, if it is in an operative condition. When the voltage impressed across the winding of the master control element X is above a predetermined value, the element X effects the energization of a time relay 14x which, when energized for a predetermined time, effects the operation of the master control relay 13x so as to effect the deenergization of the master relay with which it is associated.

The master control element Y is arranged to effect the energization of a time relay 12y, when the total current output of the station is above a predetermined value, which when energized for a predetermined time effects the operation of a master control relay 13y so as to effect the energization of the master relay of the unit with which the relay 13y is associated. The element Y is also arranged to effect the energization of a time relay 14y, when the total current output of the station is below a predetermined value, which, when energized for a predetermined time, effects the operation of the master control relay 13y so as to effect the deenergization of the master relay with which it is associated.

The master control element Z is similarly arranged to effect the energization of a time relay 12z, when the total current output of the station is above a predetermined higher value, which when energized for a predetermined time effects the operation of a master control relay 13z so as to effect the energization of the master relay of the unit with which the relay 13z is associated. The element Z is also arranged to effect the energization of a time relay 14z, when the total current output of the station is below a predetermined value, which when energized for a predetermined time, effects the operation of the master control relay 13z so as to effect the deenergization of the master relay with which it is associated.

The master control relays 13x, 13y, and 13z are of any suitable type, examples of which are well known in the art, which is so arranged that the relay remains in the position to which it is last moved by its actuating means, after the actuating means is rendered inoperative. As shown the relay 13x is provided with a closing coil 15x which when energized moves the relay to its contact closed position and an opening coil 16x which, when energized, moves the relay to its contact open position. The master control relays 13y and 13z are similarly provided respectively with the closing coils 15y and 15z and with the opening coils 16y and 16z.

In order that a master control element may control the operation of another unit when the unit normally under the control of any element is not in an operative condition, each master control element except the last one in the predetermined sequence has associated therewith an emergency starting relay which is normally connected in such a manner that it is energized if the unit normally controlled by the master control element is in an operative condition. If the unit normally controlled by a master control element is inoperative the associated emergency starting relay is deenergized so as to shift the master control element and each succeeding master control element to next idle operative unit, in the predetermined sequence.

As shown in the drawing, the master control elements X and Y have the emergency starting relays 18x and 18y respectively associated therewith for accomplishing these results. For controlling the energizations of the emergency starting relays 18x and 18y and also the master relays 4a, 4b, and 4c, the automatic switching means of each unit is provided with suitable protective devices, examples of which are well known in the art, which are arranged to operate in response to predetermined abnormal conditions of the automatic switching means and the associated unit so as to prevent the switching means from effecting the connection of the associated unit to the load circuit. As shown in the drawings, the units A, B and C have associated therewith respectively contacts 20a and 21a, contacts 20b and 21b and contacts 20c and 21c which represent the contacts of suitable protective devices associated therewith. These contacts are so connected that they are respectively in the energizing circuits of the master relay of the associated unit and in the energizing circuit of the emergency starting relay normally associated therewith and effect the deenergization of their respective master and emergency starting relays under predetermined abnormal conditions.

In multiple unit stations, it is desirable to vary the order in which the various units are operated in order to equalize the wear thereof. In the arrangement shown in the drawing, we have shown two changeover switches 24 and 25 which determine by their relative positions the order in which the units are normally operated in response to the operation of master elements X, Y and Z. When the switches 24 and 25 are in the positions shown in the drawings, the master relays 4a, 4b and 4c normally are respectively under the control of the relays 13x, 13y and 13z, and the emergency starting relays 18x and 18y are respectively controlled by the protective contacts 20a and 21a of unit A and the protective contacts 20b and 21b of unit B. When the changeover switch 24 is in its other position and the changeover switch 25 is in the position shown, the master relays 4a, 4b and 4c normally are respectively under the control of the relays 13z, 13x and 13y and the emergency starting relays 18x and 18y are respectively controlled by the protective contacts 20b and 21b of unit B and the protective contacts 20c and 21c of unit C. When both of the changeover switches 24 and 25 are in their other positions, the master relays 4a, 4b and 4c normally are respectively under the control of the relays 13y, 13z and 13x and the emergency starting relays 18x and 18y are respectively controlled by the protective contacts 20c and 21c of unit C and the protective contacts 20a and 21a of unit A. Therefore by varying the relative positions of the changeover switches the order in which the units A, B and C are normally arranged to be placed in operation in response to the successive operation of the master element X, Y and Z is changed.

In the arrangement shown, it will be seen that normally one of the units, which depends upon the positions of the switches 24 and 25, is under the control of the master element X, another unit is under the control of the master element Y and the third unit is under the control of master element Z. Therefore, when all of the units are shut down and the voltage of the load circuit 2 remains below a predetermined value for a predetermined time, the master element X effects the operation of the leading unit. When the load on this leading unit remains above a predetermined value for a predetermined time, the master element Y effects the operation of the second unit. When the total load on the station exceeds a predetermined higher value, the master element Z effects the operation of the third unit.

When the load decreases, the master elements Z, Y, X operate to effect the shutting down of the same units in the reverse order.

In order to maintain the master element X in a position to maintain in operation the unit controlled thereby after the unit has been placed in service and has restored the load circuit voltage to normal, the units A, B and C have associated therewith respectively the current responsive relays 26a, 26b and 26c which are responsive to the current output of the associated units and which, when the respective current outputs are above predetermined amounts, complete short circuits around the coil of the master element X. Therefore, as long as any unit is supplying more than a predetermined amount of current, the coil of the master element X is deenergized and, therefore, it is prevented from effecting the shutting down of any unit.

In case one or more units are in service and such an abnormally large load is connected across the load circuit that the capacity of the units in service is greatly exceeded, it is desirable to have another unit placed in service as quickly as possible. We accomplish this result by having the current relays 9a, 9b and 9c set for relatively high current outputs and by having the circuit breakers 8a, 8b and 8c, which are respectively controlled by the current relays 9a, 9b and 9c, provided respectively with auxiliary contacts 28a, 28b and 28c which, when closed, are connected in the circuit of the associated emergency starting relays. Therefore, whenever anyone of the circuit breakers 8a, 8b and 8c is opened while its associated unit is in service, the emergency starting relay associated with open circuit breaker is deenergized to effect the immediate starting of the next operative unit which is not in service. In order that the emergency starting relays 18x and 18y may be may be maintained energized when the associated units are shut down and the associated circuit breakers 8a, 8b and 8c are open, each unit has associated therewith means for maintaining the associated emergency starting relay energized independently of the auxiliary contacts of the associated resistor short circuiting circuit breaker until after the unit has been connected to the load circuit for a predetermined time. In the embodiment of our invention shown in the drawings, the unit A is provided with a time relay 30a which, when deenergized, completes a circuit around the associated contacts 28a. The energization of the relay 30a is controlled by circuit breaker 6a so that after the circuit breaker 6a has been closed a predetermined time, the relay 30a operates to remove the shunt circuit from around the contacts 28a so that if these contacts are subsequently opened while the circuit breaker 6a is closed, the associated emergency starting relay is deenergized to effect the starting of the next idle operative unit in the predetermined sequence. The units B and C are similarly provided with the time relays 30b and 30c respectively to accomplish the same result.

In order that the operating sequence of the units may be changed without shutting down any of the units that may be in operation, a manually operated switch 31 is provided which, when closed, completes energizing circuits for the master relays 4a, 4b and 4c independently of the master elements X, Y and Z or any of their associated devices and also independently of the change-over switches 24 and 25 so that, while the switch 31 is closed, the switches 24 and 25 may be changed to any position desired without in any way affecting the operation of any unit which is in service. In case it is desired not to start a unit when the operating sequence is being changed, the circuits of the master relays 4a, 4b and 4c respectively include manually controlled stop switches 32a, 32b and 32c which may be opened so that the closing of the switch 31 does effect the energization of the respective master relays.

The operation of the embodiment of our invention shown in the drawings is as follows: Let it be assumed that the voltage across the load circuit 2 is normal, the units A, B and C are shut down but in an operative condition and that the changeover switches 24 and 25 are in the positions shown so that units A, B and C are respectively under the control of the master elements X, Y and Z. Under the conditions assumed, the various control devices are in the position shown in the drawings. Since the load circuit voltage is normal and the current output of all the units is below the settings of the control elements Y and Z, the stopping contacts 33x, 33y and 33z of the elements X, Y and Z are closed and complete respectively energizing circuits for the time relays 14x, 14y and 14z across a suitable source of control current so that the master control relays 13x, 13y and 13z are in the positions shown. Any suitable source of control current, such as a potential transformer 34 connected to the supply circuit 1, may be provided. In order to simplify the drawings, however, the various control circuits are not shown completed to the potential transformer secondary terminals but it is to be understood that the positive and negative designated ends of each control circuit are connected respectively to the positive and negative designated secondary terminals of the transformer 34.

The circuit of the stopping time relay 14x includes the contacts 33x of the master control element X and the contacts 36x of the emergency starting relay 18x which is energized in a manner hereafter described. The circuit of the stopping time relay 14y is from one side of the control circuit, through contacts 33y of the master control element Y, conductor 225, contacts 53x of energized emergency starting relay 18x, conductor 226, contacts 54y of relay 18y which is energized in a manner hereinafter described, winding of relay 14y to the other side of the control circuit. The circuit of the stopping time relay 14z is from one side of the control circuit, contacts 33z of the master control element Z, conductor 221, contacts 52x of energized emergency starting relay 18x, conductor 222, contacts 53y of energized emergency starting relay 18y, conductor 203, winding of relay 14z to the other side of the control circuit.

Under the conditions assumed, the starting protective relays 18x and 18y are energized since the units are assumed to be in operative condition. The energizing circuit of the relay 18x is from one side of the control circuit through the winding of relay 18x, conductor 200, contacts 101 and 108 of switch 25, contacts 119 and 126 of switch 24, conductor 201, contacts 45a of relay 30a, conductor 202, protective contacts 21a and 20a to the other side of the control circuit. The energizing circuit of the relay 18y is from one side of the control circuit, through winding of relay 18y, conductor 203, contacts 103 and 112 of switch 25, contacts 121 and 130 of switch 24, conductor 204, contacts 45b of relay 30b, conductor 205, protective contacts 21b and 20b to the other side of the control circuit.

When the load circuit voltage decreases below a predetermined value under the conditions assumed, the master control element X opens its stopping contacts 33x, thereby deenergizing the time relay 14x, and closes its starting contacts 35x, thereby completing an energizing circuit for the starting time relay 12x. If the load circuit voltage remains below said predetermined value for a predetermined time, the time relay 12x completes through its contacts 46x and contacts 37x of the relay 13x, an energizing circuit for the winding 15x of the relay 13x so that the relay 13x closes its contacts 38x in the circuit of the master control relay 4a. The relay 13x, in moving to its contact closing position, is arranged to open its contacts 37x, thereby effecting the deenergization of the winding 15x. The relay 13x, however, remains in its contact closed position after the deenergization of the winding 15x.

The energizing circuit of the master control relay 4a is from one side of the control circuit, through contacts 38x of relay 13x, conductor 210, contacts 100 and 106 of switch 25, contacts 118 and 124 of switch 24, conductor 211, stop switch 32a, winding of relay 4a, conductor 202, protective contacts 21a and 20a to the other side of the control circuit. Relay 4a by closing its contacts 39a effects the operation of the automatic switching means 5a so that the unit A is started and placed in an operative condition to supply current to the load circuit 2. As soon as the unit A reaches the proper condition to be connected to the load circuit, the contacts 10a are closed so that the closing coil 40a of the circuit breaker 6a is connected across the direct terminals of the unit A. The circuit of the coil 40a also includes the contacts 41a of the master relay 4a. The energization of the closing coil 40a effects the closing of the circuit breaker 6a so that the unit A is connected across the load circuit 2 with resistor 7a in series. If the current output of the unit A does not exceed a predetermined value, when the circuit breaker 6a closes, a circuit is completed for the closing coil 42a of the circuit breaker 8a so that the circuit breaker 8a is closed to short circuit the resistor 7a. The circuit of the closing coil 42a is from one terminal of the unit A through the coil 42a, contacts 43a on circuit breaker 6a, contacts 44a of overcurrent relay 9a to the other terminal of the unit A.

As soon as the unit A begins to supply current to the load circuit 2, the current relay 26a if the current output exceeds a predetermined amount, closes its contacts 47a thereby short circuiting the coil of the master element X so that its starting contacts 35x remain closed as long as the output of the leading unit exceeds a predetermined value.

The closing of the auxiliary contacts 48a on the circuit breaker 6a effects the energization of the time relay 30a which, after a predetermined time which is sufficient under normal operating conditions to allow the circuit breaker 8a to close, opens its contacts 45a in the above traced circuit of the emergency starting relay 18x. If the current output of the unit A does not exceed a predetermined relatively high abnormal value after the circuit breaker 6a closes, the relay 9a maintains its contacts 44a closed so that the circuit breaker 8a is immediately closed and its auxiliary contacts 28a complete a circuit for the emergency starting relay 18x before the time relay 30a has time to open its contacts 45a.

If, while the unit A is in service, the load increases to a predetermined value, the current output of the unit A causes the master element Y to open its stopping contacts 33y and close its starting contacts 35y. The closing of the starting contacts 35y completes an energizing circuit for the time relay 12y which, if energized for a predetermined time, closes its contacts 46y and completes an energizing circuit for the winding 15y of the control relay 13y to move it to its contact closed position. The circuit of the winding 15y is from one side of the control circuit through contacts 37y and winding 15y of relay 13y, conductor 212, contacts 49x of relay 18x, conductor 213, contacts 46y of time relay 12y to the other side of the control circuit. The energization of the winding 15y causes the relay 13y to close its contacts 38y and completes an energizing circuit for the master relay 4b. This energizing circuit is from one side of the control circuit through the contacts 38y of relay 13y, conductor 214, contacts 102 and 110 of switch 25, contacts 120 and 128 of switch 24, conductor 215, stop switch 32b, winding of relay 4b, conductor 205, protective contacts 21b and 20b, to the other side of the control circuit. Relay 4b by closing its contacts 39b effects the operation of the automatic switching means 5b so that the unit B is started and placed in an operative condition to supply current to the load circuit 2. As soon as the unit B reaches the proper condition to be connected to the load circuit 2, the contacts 10b are closed so that the closing coil 40b of the circuit breaker 6b is connected across the direct current terminals of the unit B to effect the closing of the circuit breaker 6b. The circuit of the winding 40b also includes the contacts 41b of the master relay 4b. If the current output of the unit B does not exceed a predetermined value when the circuit breaker 6b closes, a circuit is completed for the closing coil 42b of the circuit breaker 8b so that the resistor 7b, which is in series with the unit B, is short circuited. The circuit of the closing coil 42b is from one terminal of the unit B through the closing coil 42b, auxiliary contacts 43b on circuit breaker 6b, contacts 44b of overcurrent relay 9b to the other terminal of the unit B.

When the circuit breaker 6b closes, the current relay 26b closes its contacts 47b to complete a short circuit around the winding of the master element X, and the auxiliary contacts 48b on the circuit breaker 6b completes an energizing circuit for the time relay 30b to effect, after a predetermined time, the opening of the contacts 45b in the above traced circuit of the emergency starting relay 18y. The closing of the auxiliary contacts 28b on the circuit breaker 8b, however, completes a shunt circuit around the contacts 45b before they are opened, and, therefore, the emergency starting relay 18y remains energized.

If, while both of the units A and B are in service, the load increases to a predetermined value, the total current output of the two units causes the master element Z to open its stopping contacts 33z and close its starting contacts 35z. The closing of the contacts 35z completes an energizing circuit for the time relay 12z, which, if energized for a predetermined time, closes its contacts 46z and completes an energizing circuit for the winding 15z of the control relay 13z to move it to its contact closed position. The circuit of the winding 15z is from one side of the control circuit through contacts 37z and winding 15z of relay 13z, conductor 216, contacts 49y of relay 18y, conductor 217, contacts 50x of relay 18x, conductor 218, contacts 46z of relay 12z to the other side of the control circuit. The energization of the winding 15z causes the relay 13y to close its contacts 38z and thereby complete an energizing circuit for the master relay 4c. This energizing circuit for relay 4c is from one side of the control circuit through the contacts 38z of relay 13z, conductor 219, contacts 104 and 114 of switch 25, contacts 122 and 132 of switch 24, conductor 220, stop switch 32c, winding of relay 4c, protective contacts 21c and 20c to the other side of the control circuit. Relay 4c, by closing its contacts 39c, effects the operation of the automatic switching means 5c so that the unit C is started and placed in an operative condition to supply current to the load circuit 2. As soon as the unit C reaches the proper condition to be connected to the load circuit 2, the contacts 10c are closed so that the closing coil 40c of the circuit breaker 6c is connected across the direct current terminals of the unit C to effect the closing of the circuit breaker 6c. The circuit of the winding 40c also includes the contacts 41c of the master relay 4c. If the current output of the unit C does not exceed a predetermined value when the circuit breaker 6c closes, a circuit is completed for the closing coil 42c of the circuit breaker 8c so that the resistor 7c, which is in series with unit C is short circuited. The circuit of the closing coil 42c is from one terminal of the unit C through the closing coil 42c, auxiliary contacts 43c on circuit breaker 6c, contacts 44c of overcurrent relay 9c to the other terminal of the unit C.

When the circuit breaker 6c closes, the current relay 26c closes its contacts 47c to complete a short circuit around the winding of the master element X, and the auxiliary contacts 48c on the circuit breaker 6c completes an energizing circuit for the time relay 30c to effect, after a predetermined time, the opening of the contacts 45c in the above traced circuit of the emergency starting relay 18z. The closing of the auxiliary contacts 28c on the circuit breaker 8c, however, completes a shunt circuit around the contacts 45c before they are opened, and, therefore, the emergency starting relay 18z remains energized.

When the three units A, B and C are in operation, and the load decreases to such a value that two of the sources can supply it, the master element Z opens its starting contacts 35z to effect the deenergization of the time relay 12z and closes its stopping contacts 33z to effect the above traced circuit for the time relay 14z. The relay 14z by closing its contacts 55z completes, through the contacts 56z of the relay 13z, an energizing circuit for the winding 16z to effect the movement of the relay 13z to its contact open position. The relay 13z, by opening its contacts 38z, effects the deenergization of the master relay 4c, which by opening its contacts 39c and 41c effects the opening of the circuit breakers 6c and 8c and the operation of the automatic switching means 5c to effect the shutting down of the unit C.

When the units A and B are in service and the total output of the two units decreases to a value which is within the capacity of the leading unit A, the master element Y opens its starting contacts 35y to effect the deenergization of the time relay 12y and closes its stopping contacts 33y to effect the above traced energizing circuit for the time relay 14y. The relay 14y, by closing its contacts 55y, completes, through the contacts 56y of the relay 13y, an energizing circuit for the winding 16y to effect the movement of the relay 13y to its contact open position. The relay 13y, by opening its contacts 38y, effects the deenergization of the master relay 4b, which by opening its contacts 39b and 41b effects the opening of the circuit breakers 6b and 8b and the operation of the automatic switching means 5b to effect the shutting down of the unit B.

When only the leading unit A is supplying current to the load circuit 2 and the current output of the unit A decreases to a predetermined small value, the current relay 26a opens its contacts 47a, thereby removing the short circuit from around the winding of the master element X. If the load circuit voltage is normal, the removal of the short circuit around the winding of the master element X causes the element X to open its starting contacts 35x so that the time relay 12x is deenergized and to close its stopping contacts 33x so that an energizing circuit is completed through contacts 36x of relay 18x for the time relay 14x. After a predetermined time, the relay 14x closes its contacts 55x and completes through the contacts 56x an energizing circuit for the winding 16x of the relay 13x to effect the movement of the relay 13x to its contact open position. The relay 13x by opening its contacts 38x, effects the deenergization of the master relay 4a, which by opening its contacts 39a and 41a effects the opening of the circuit breakers 6a and 8a and the operation of the automatic switching means 5a to effect the shutting down of the unit A.

Heretofore, in the description of the operation, it has been assumed that each unit was in an operative condition so that its associated protective contacts are closed. If one of the protective contacts 20a and 21a is open, so that the emergency starting relay 18x is deenergized, when the time relay 12x closes its contacts 46x in response to the closing of the starting contacts 35x of the master element X, the closing of the contacts 46x under the conditions assumed not only effects the energization of winding 15x to move the relay 13x to its contact closed position, but also effects the energization of the winding 15y to move the relay 13y to its contact closed position. This energizing circuit of the winding 15y is from one side of the control circuit through contacts 37y and winding 15y of relay 13y, conductor 212, contacts 58x of relay 18x, contacts 46x of relay 12x to the other side of the control circuits. Since one of the protective contacts associated with the unit A is open, the closing of the contacts 38x of relay 13x does not complete the above traced circuit of the master relay 4a to effect the starting of the unit A. The closing of the contacts 38y of relay 13y, however, completes the above traced energizing circuit of the master relay 4b, if the unit B is in an operative condition, so that the unit B is placed in service instead of unit A. The current relay 26b maintains the winding of the master element X short circuited as long as the current output of the unit B remains above a predetermined value.

When the unit B is in operation, while the emergency starting relay 18x is deenergized, the stopping of the unit B is under the control of the master element X. When the current output of the unit B decreases sufficiently to allow the current relay 26b to open its contacts 47b, the master element X opens its starting contacts 35x and closes its stopping contacts 33x which complete an energizing circuit for the time relay 14y. This energizing circuit is from one side of the control circuit through contacts 33x of master element X, contacts 60x of emergency starting relay 18x, conductor 226, contacts 54y of emergency starting relay 18y, winding of time relay 14y to the other side of the control circuit. The relay 14y then effects, in the manner above described, the operation of the relay 13y to effect the shutting down of the unit B.

If the load is sufficient to cause the master element Y to close its contacts 35y and effect the energization of the time relay 12y while the unit A is inoperative, the unit B is in operation and the unit C is in an operative condition, the closing of the contacts 46y of the time relay completes an energizing circuit for the winding 15z of the relay 13z to effect the movement of the relay 13z to its contact closed position so that the master 4c is energized to effect, in the manner above described, the connection of the unit C to the load circuit. The energizing circuit of the winding 15z is from one side of the control circuit through contacts 37z and winding 15z of relay 13z, conductor 216, contacts 49y of emergency starting relay 18y, conductor 217, contacts 61x, conductor 213, contacts 46y of time relay 12y to the other side of the control circuit.

When the unit A is in an inoperative condition and the units B and C are supplying current to the load circuit 2, and the total load decreases below a predetermined value, the master element Y opens its contacts 35y, and closes its contacts 33y, thereby effecting the energization of the time relay 14z so that the shutting down of the unit C is effected in the manner above described. This energizing circuit of the relay 14z is from one side of the control circuit through contacts 33y of master element Y, conductor 225, contacts 62x of emergency starting relay 18x, conductor 222, contacts 53y of emergency starting relay 18y, conductor 203, contacts 54z of emergency starting relay 18z, winding of time relay 14z to the other side of the control circuit.

If both of the units A and B are in an inoperative condition so that their respective emergency starting relays 18x and 18y are deenergized, when the relay 12x closes its contacts 46x in response to the closing of the contacts 35x of the master element X, an energizing circuit is completed for the winding 15z of relay 13z to effect, in the manner above described, the starting of the unit C, also the closing of the contacts 33x of the master element X under the conditions asumed, completes an energizing circuit for the time relay 14z to effect, in a manner above described, the shutting down of the unit C. The energizing circuit for the winding 15z is from one side of the control circuit, through contacts 37z and winding 15z of relay 13z conductor 216, contacts 58y of emergency starting relay 18y, conductor 212, contacts 58x of emergency starting relay 18x, contacts 46x of relay 12x to the other side of the control circuit. The energizing circuit for the time relay 14z is from one side of the control circuit through contacts 33x of master element X, contacts 60x of emergency starting relay 18x, conductor 226, contacts 60y of emergency starting relay 18y, conductor 223, contacts 54z of emergency starting relay 18z, winding 14z to the other side of the control circuit. After the unit C is connected to the load circuit 2, the current relay 26c maintains the winding of the master element X short circuited as long as the current output of the unit C exceeds a predetermined amount. Therefore under the conditions assumed the unit C operates as the leading unit under the control of the master element X.

If the units A and C are in an operative condition so that their respective emergency starting relays 18x and 18z are energized and the unit B is in an inoperative condition so that its respective emergency starting relay 18y is deenergized, the unit A is controlled by the master element X in the manner above described but the unit C is under the control of the master element Y. When the total load is such that the master element Y effects the closing of the contacts 46y of the time relay 12y, an energizing circuit is completed for the winding 15z of the relay 13z to effect, in the manner above described, the starting of the unit C and when the total load is such that the master element Y effects the closing of its contacts 33y, an energizing circuit for the time relay 14z is completed to effect, in the manner above described, the shutting down of the unit C. The energizing circuit of the winding 15z is from one side of the control circuit through contacts 37z and winding 15z of relay 13z, conductor 216, contacts 58y of emergency starting relay 18y, conductor 212, contacts 49x of emergency starting relay 18x, conductor 213, contacts 46y of relay 12y to the other side of the control circuit. The energizing circuit for the time relay 14z is from one side of the control circuit, through contacts 33y of master element Y, conductor 225, contacts 53x of emergency starting relay 18x, conductor 226, contacts 60y of emergency starting relay 18y, conductor 203, winding of time relay 14z to the other side of the control circuit.

Let it be assumed now that while the second unit B is operating in place of the leading unit A, which is not in an operative condition for some reason, the inoperative condition is remedied so that all of the protective contacts 20a and 21a are closed, and thereby effect, in the manner above described, the energization of the master relay 4a and the emergency starting relay 18x. The energization of the master relay 4a effects in the manner above described the immediate starting of the unit A since the contacts 38x of the relay 13x are closed under the conditions assumed. The energization of the emergency starting relay 18x places the time relays 14x, 14y and 14z under the control of the master elements X, Y and Z respectively and removes the control of the relays 13y and 13z from the elements X and Y respectively. If the load is such that the contacts 33y are closed when the emergency starting relay 18x is reenergized, the time relay 14y is energized to effect, in the manner above described, the shutting down of the unit B. The time required for the relay 14y to close its contacts 55y, however, is sufficient to allow the automatic switching means 3a for the leading unit A to effect the starting and connection of the unit A to the load circuit 2 before the unit B is shut down. This feature of controlling the energizations of the time relays 14x, 14y and 14z by means of the emergency starting relays 18x, 18y and 18z so that the shutting down of a replacing unit is delayed for a sufficient length of time to allow the replaced unit, when it becomes operative again, to be reconnected to the load circuit is one of the important features of our invention.

Let it be assumed that the unit C is operating in place of unit B under the control of the master element Y and the unit B again becomes operative so that the master relay 4b and the emergency starting relay 18y are energized in the manner above described. The energization of the relay 4b effects the starting and connection of unit B to the load circuit 2 and the energization of the emergency starting relay 18y restores the control of the time relay 14z to the master element Z so that if the total load is such that the contacts 33z of the master element Z are closed, the unit C is shut down after a sufficient time interval has elapsed to allow the replaced unit B to be reconnected to the load circuit 2.

Another important feature of our invention is the arrangement whereby the next operative succeeding unit in the predetermined sequence is immediately started in case the output of a unit in operation exceeds a predetermined amount. For example, assume the unit A is in service and the load suddenly increases to a value sufficient to cause the relay 9a to open its contacts 44a so as to effect the opening of the circuit breaker 8a and the insertion of the current limiting resistor 7a in circuit. The opening of the auxiliary contacts 28a on the circuit breaker 8a effects the deenergization of the emergency starting relay 18x which, in the manner above described, immediately completes a circuit for the winding 15y of the relay 13y to move the relay 13y to its contact closed position and thereby effect the starting of the unit B before the time relay 12y completes its timing operation. As soon as the unit B is placed in service and takes its share of the load so that output of the unit A decreases below a predetermined value, the relay 9a recloses its contacts 44a and effects the reclosing of the circuit breaker 8a.

In a similar manner, the operation of the over-current relay 9b of the second unit under predetermined current conditions effects the opening of the circuit breaker 8b which, in turn by opening its auxiliary contacts 28b effects the deenergization of the emergency starting relay 18y to effect, independently of the time relay 12z, the immediate energization of the winding 15z of the relay 13z to place the unit C in operation.

Another important feature of our invention is the provision of an arrangement which effects the immediate restarting of all the units previously in service when the abnormal condition, which effects the shutting down of the units, is removed. For example, assume all of the units are in service and the source of current (not shown) which supplies the supply circuit 1 fails. Each unit is provided with suitable means (not shown), but examples of which are well known in the art, for effecting the operation of one of the protective devices associated therewith under such reverse current conditions to effect the disconnection of the unit from the load circuit 2 and the shutting down of the unit. The relays 13x, 13y and 13z, however, remain in their contact closed position since the time relays 14x, 14y and 14z respectively are not energized for a sufficient length of time to effect the energizing of the winding 16x, 16y and 16z before all of the units are shut down. Therefore, when voltage is restored to normal across the supply circuit 1, the relays 13x, 13y and 13z are in a position to effect the immediate reenergization of the master relays 4a, 4b and 4c to effect the restarting of their respective units.

It will be obvious to those skilled in the art that if for any reason the control transformer 34 fails all of the units in operation are shut down, and when the control circuit is reenergized, those units which were previously in service are immediately restarted.

If less than all of the units are in operation at the time the abnormal condition occurs which causes the shutting down of all of the units in service, only the control relays associated with the units in service are in their contact closed positions and, therefore, only the units which were previously in service are immediately restarted when conditions are restored to normal.

In the description of the operation given heretofore it has been assumed that the switches 24 and 25 were in the positions shown so that normally the master elements X, Y and Z respectively control the units A, B and C. If, however, it is desired to have the elements X, Y and Z normally control the units B, C and A respectively the switch 24 is placed in its other position. In this other position of the switch 24, the contact 118 is in engagement with the contact 125 so that the contacts 38x are connected in the circuit of the master relay 4b; the contact 119 is in engagement with the contact 127 so that the emergency starting relay 18x is placed under the control of the protective contacts 20b and 21b, the relay contacts 45b and the auxiliary contacts 28b on circuit breaker 80; the contact 120 is in engagement with contact 129 so that the contacts 38y are connected in the circuit of the master relay 4c; the contact 121 is in engagement with contact 131 so that the emergency starting relay 18y is placed under the control of the protective contacts 20c and 21c, the relay contacts 45c and the auxiliary contacts 28c of circuit breaker 8c; the contact 122 is in engagement with the contact 133 so that the contacts 38z are in the circuit of the master relay 4a.

The units B, C and A, therefore, are normally controlled by the elements X, Y and Z respectively. It will be obvious, however, to those skilled in the art that if the unit B is inoperative, the units C and A, if operative, are respectively placed under the control of the elements X and Y, and if the unit C is inoperative, the unit A, if operative, replaces the unit C.

If it is desired to have the master elements X, Y and Z normally control the units C, A and B respectively, the switch 25 is placed in its other position. In this other position of switch 25, the contact 100 is in engagement with contact 107 so that contacts 38$x$ are connected in the circuit of master relay 4$c$; the contact 101 is in engagement with contact 109 so that the emergency starting relay 18$x$ is controlled by the protective contacts 20$c$ and 21$c$, the relay contacts 45$c$ and the auxiliary contacts 28$c$ on circuit breaker 8$c$; the contact 102 is in engagement with contact 111 so that contacts 38$y$ are in the circuit of master relay 4$a$; the contact 103 is in engagement with contact 113 so that the emergency starting relay 18$y$ is controlled by the protective contacts 20$a$ and 21$c$, the relay contacts 45$a$ and the auxiliary contacts 28$a$ on circuit breaker 8$a$; the contact 104 is in engagement with contact 115 so that contacts 38$z$ are in the circuit of master relay 4$b$.

The units C, A and B, therefore, are normally controlled by the elements X, Y and Z respectively. It will be obvious, however, to those skilled in the art, that if unit C is in an inoperative condition, the relay 18$x$ places the units A and B, if each is in an operative condition, under the control of the elements X and Y respectively and if the unit A is in an inoperative condition and the unit B is in an operative condition, the relay 18$z$ places the unit B under the control of the element which would control the unit A if it were operative.

If it is desired to change the order in which the units are placed in operation while one or more of the units are in service, the switch 31 is first closed so as to complete, independently of the switches 24 and 25, energizing circuits for the master relays 4$a$, 4$b$ and 4$c$ so that the respective units, if operative, are placed in operation. Then while the switch 31 is still maintained closed, the switches 24 and 25 are moved to the desired positions. Then the switch 31 is opened and the various units are controlled in accordance with the existing load and the positions of the switches 24 and 25. If it is desired not to start up one of the units while the sequence is changed, the associated stop switch is opened before the switch 31 is closed. For example, assume the unit A is normally under the control of master element X and the load is such that it is the only unit in operation, and it is desired to change the sequence of operation of the units so that the unit C is the leading unit. Under such conditions, it is unnecessary to start the unit B when the sequence is changed because as soon as the sequence changing operation is completed, the unit B shuts down. Therefore, in such a case the stop switch 32$b$, associated with unit B, would first be opened, then switch 31 would be closed, then switch 25 would be moved to its other position, and then the switch 31 would be opened and switch 32$b$ would be closed.

While we have, in accordance with the Patent Statutes, shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is:

1. In combination, a multiple unit station, automatic switching means associated with each unit for placing it in operation, means associated with each automatic switching means for effecting the operation thereof after a predetermined time delay to effect the placing of the associated unit in operation, means responsive to a predetermined abnormal condition of said station for effecting the shutting down of all of the units in operation, and means for effecting, when said abnormal condition is restored to normal, the immediate operation of the automatic switching means associated with all of the units which were shut down in response to said predetermined abnormal condition to effect the operation of the associated units.

2. In combination, a multiple unit station, automatic switching means associated with each unit for placing it in operation, starting means associated with each automatic switching means for effecting the operation thereof, a plurality of master elements, timing means associated with each master element for effecting the operation of a starting means after the associated master element has remained in a predetermined position for a predetermined time, said timing means being normally associated respectively with different starting means so that each master element normally controls a different starting means, means responsive to a predetermined abnormal condition of said station for effecting independently of the positions of said master elements the shutting down of all of the units in operation, and means for effecting, when said abnormal condition is restored to normal, the immediate operation of the automatic switching means associated with all of the units which were shut down in response to said predetermined abnormal condition to effect the operation of the associated units.

3. In combination, a multiple unit station, automatic switching means associated with each unit for placing it in operation, a master relay associated with each automatic switching means for effecting, when energized, the operation of the associated automatic switching means to place the associated unit in service and for effecting, when de-energized, the operation of the associated switching means to shut down the associated unit, means associated with each master relay for controlling the energization thereof including control means, timing means responsive to a predetermined condition of the control means for effecting after a predetermined time the energization of the master relay, and timing means responsive to another predetermined condition of the control means for effecting, after a predetermined time, the deenergization of the master relay, means responsive to a predetermined abnormal condition of said station for effecting the deenergization of all of the master relays independently of the associated timing means which normally control the deenergization thereof, and means for effecting, when said abnormal condition is restored to normal, the immediate energization of the master relays which were deenergized upon the occurrence of said abnormal condition.

4. In combination, a multiple unit station, automatic switching means associated with each unit for placing it in operation, a master relay associated with each automatic switching means for effecting when energized the operation of the associated automatic switching means to place the associated unit in service and for effecting, when deenergized, the operation of the associated switching means to shut down the associated unit, means associated with each master relay for controlling the energization thereof including control means, a two position relay which remains in the position to which it is last actuated and which, in one of its positions, completes an energizing circuit for the associated master relay, and means controlled by the control means for actuating said relay to its two positions.

5. In combination, a multiple unit station, automatic switching means associated with each unit for placing it in operation, a master relay associated with each automatic switching means for effecting, when energized, the operation of the associated automatic switching means to place the associated unit in service and for effecting, when deenergized, the operation of the associated switching means to shut down the associated unit, means associated with each master relay for controlling the energization thereof including control means, a two position relay which, in one of its positions, effects the completion of an energizing circuit for the associated master relay, a time relay responsive to a predetermined condition of the control means for effecting the actuation of said two position relay to one of its positions and a time relay responsive to another condition of the control means for effecting the actuation of said two position relay to its other position.

6. In combination, a multiple unit station, automatic switching means associated with each unit for placing it in operation, a master relay associated with each automatic switching means for effecting, when energized, the operation of the associated automatic switching means to place the associated unit in service and for effecting, when deenergized, the operation of the associated switching means to shut down the associated unit, and means for controlling the energization of said master relays including master control means for each master relay, a two position device associated with each master control means, each two position device being constructed so that it remains in the position to which it is last actuated, means controlled by each master control means for actuating the associated two position device to its two positions, contact associated with each two position device, and switching means for selectively connecting said contacts and said master relays in circuit whereby the units of the station may be placed under the normal control of different master control means.

7. In combination, a multiple unit station, automatic switching means associated with each unit for placing in operation and for shutting it down, a master relay associated with each automatic switching means, a starting time relay normally associated with each master relay for effecting the energization thereof, a stopping time relay normally associated with each master relay for effecting the deenergization thereof, control means normally arranged to control the time relays associated with one of said master relays, and means responsive to a predetermined condition of the unit with which said one of said master relays is associated for placing another master relay under the control of the starting time relay which is under the control of said control means and the stopping time relay associated with said last mentioned master relay under the control of said control means when said predetermined condition exists and for restoring the normal conditions when said predetermined condition ceases to exist.

8. In combination, a multiple unit station, automatic switching means associated with each unit for placing it in operation and for shutting it down, a master relay associated with each automatic switching means, a starting time relay normally associated with each master relay for effecting the energization thereof, a stopping time relay normally associated with each master relay for effecting the deenergization thereof, control means normally arranged to control the time relays associated with one of said master relays, other control means normally arranged to control the time relays associated with another of said master relays, and means responsive to a predetermined condition of the unit normally controlled by said first mentioned control means, for placing the master relay normally controlled by said other control means under the control of starting time relay controlled by said first mentioned control means and for removing the stopping time relay controlled by said other control means from the control thereof and placing it under the control of the first mentioned control means.

9. In combination, a multiple unit station, automatic switching means associated with each unit for placing it in operation and for shutting it down, a master relay associated with each automatic switching means, a starting time relay normally associated with each master relay for effecting the energization thereof, a stopping time relay normally associated with each master relay for effecting the deenergization thereof, control means normally arranged to control the time relays associated with one of said master relays, other control means normally arranged to control the time relays associated with another of said master relays, and means responsive to a predetermined condition of the unit normally controlled by said first mentioned control means for placing the master relay normally controlled by said other control means under the control of starting time relay controlled by said first mentioned control means and for removing the stopping time relays controlled by each of said control means from the control thereof and placing under the control of said first mentioned control means the stopping time relay which is normally controlled by said other control means.

10. In combination, a multiple unit station, automatic switching means associated with each unit for placing it in operation and for shutting it down, a master relay associated with each automatic switching means, a starting time relay normally associated with each master relay for effecting the energization thereof, a stopping time relay normally associated with each master relay for effecting the deenergization thereof, a plurality of sequentially operable master elements normally controlling respectively the time relays associated with different master relays whereby the units with which said master relays are associated are operated normally in a predetermined order, and means associated with each unit and operative while a predetermined condition thereof exists to place the master relay associated with each succeeding unit in said predetermined order respectively under the control of the starting time relay normally associated with the next preceding unit in said predetermined order and to remove the stopping time relay normally associated therewith and with each succeeding unit in said predetermined order from the control of the master control elements normally controlling the operation thereof and to place the stopping time relay associated with each succeeding units in said predetermined order respectively under the control of the master control element which normally controls the operation of the respective next preceding unit in said predetermined order.

11. In combination, a multiple unit station, automatic switching means associated with each unit for placing it in operation and for shutting it down, a master relay associated with each automatic switching means, a plurality of master control elements for sequentially controlling the operation of said master relays, an emergency starting relay associated with each master control element for placing another master relay under the control thereof, protective contacts associated with each unit, and switching means for selectively controlling the connections between said master control elements and said master relays and between said emergency starting relays and said protective contacts whereby the order in which the units are operated by a predetermined sequential operation of said master control element can be changed and whereby the protective contacts associated with each unit controls the energization of the emergency starting relay associated with the master control element which normally controls the operation of the unit.

12. In combination, a multiple unit station, automatic switching means associated with each unit for placing it in operation and for shutting it down, a master relay associated with each automatic switching means, a master control element for normally controlling the energization of one of said master relays, an emergency starting relay associated with said master control element for placing another master relay under the control of said element, protective contacts associated with each unit, and switching means for selectively controlling the connections between said master control element and said master relays and between said emergency starting relay and said protective contacts whereby said element may normally control the operation of different units and whereby the energization of said emergency starting relay is always controlled by the protective contacts associated with the unit which is normally placed under the control of said element by said switching means.

13. In combination, an electric circuit, a plurality of sources of current, switching means associated with each source for controlling the connection thereof to said electric circuit including a master relay which, when energized, causes the switching means to connect the source to the electric circuit and which, when deenergized causes the switching means to disconnect the source from the electric circuit, master control means for normally controlling the energization of one of said master relays, an emergency starting relay associated with said master control means for placing the master relay associated with another source under the control of said master control means, protective contacts associated with the source whose master relay is normally controlled by said master control element for controlling the energization of the associated master relay and said emergency starting relay, and means responsive to a predetermined condition of the source which is normally controlled by said master control means for effecting, while the associated master relay remains energized, the operation of the emergency starting relay to effect the energization of the master relay associated with another source.

14. In combination, an electric circuit, two sources of current, switching means associated with each source for controlling the connection thereof to said electric circuit including a master relay which when energized causes the switching means to connect the source to the electric circuit and which, when deenergized, causes the switching means to disconnect the source from the electric circuit, master control means for controlling the energization of one of said master relays, an emergency starting relay associated with said master control means and arranged when deenergized to place the other master relay under the control of said master control means, other master control means normally arranged to effect the energization of said other master relay after a predetermined condition has existed for a predetermined time, protective contacts associated with the unit normally controlled by said first mentioned master control means for effecting, under predetermined abnormal conditions, the deenergization of the associated master relay and said emergency starting relay, and means for effecting the deenergization of said emergency starting relay while the master relay of the unit normally controlled by said first mentioned master control means remains energized whereby the energization of said other master relay may be effected immediately and independently of said other master control means if said first mentioned master control means is in a predetermined position.

15. In combination, an electric circuit, two sources of current, switching means associated with each source for controlling the connection thereof to said electric circuit including a master relay which, when energized, causes the switching means to connect the source to the electric circuit and which, when deenergized, causes the switching means to disconnect the source from the electric circuit, master control means for controlling the energization of one of said master relays, an emergency starting relay associated with said master control means and arranged when deenergized to place the other master relay under the control of said master control means, means controlled by the current output of the source normally controlled by said master control means for effecting in response to predetermined current conditions which exist for a predetermined time the energization of said other master relay, protective contacts associated with the source normally controlled by said master control means for effecting under predetermined abnormal conditions the deenergization of the associated master relay and said emergency starting relay, and means responsive to a predetermined abnormal current output of the source normally controlled by said master control means for effecting, while the associated master relay remains energized, the deenergization of said emergency starting relay to effect the immediate energization of said other master relay.

16. In combination, an electric circuit, two sources of current, switching means associated with each source for controlling the connection thereof to said electric circuit including current limiting means, a circuit breaker for connecting the source to said electric circuit with the current limiting means in series, a second circuit breaker for short circuiting said current limiting means, means responsive to the current output of the source for controlling said second circuit breaker, a master relay for controlling the operation of said circuit breaker, protective contacts associated with the source and a circuit for said master relay including the associated protective contacts, master control means for controlling the circuit of one of said master relays, an emergency starting relay associated with said master control means and arranged, when deenergized, to place the other master relay under the control of said master control means, an energizing circuit for said emergency starting relay including the protective contacts associated with the source normally controlled by said master control means, other contacts in said energizing circuit controlled by the short circuiting circuit breaker associated with the source normally controlled by said master control means, and means controlled by the other circuit breaker associated with the source normally controlled by said master control means for maintaining said other contacts short circuited until after said last mentioned circuit breaker has been closed a predetermined length of time.

In witness whereof, we have hereunto set our hands this third day of March, 1930.

WILLIAM N. GITTINGS.
HAROLD T. SEELEY.